UNITED STATES PATENT OFFICE.

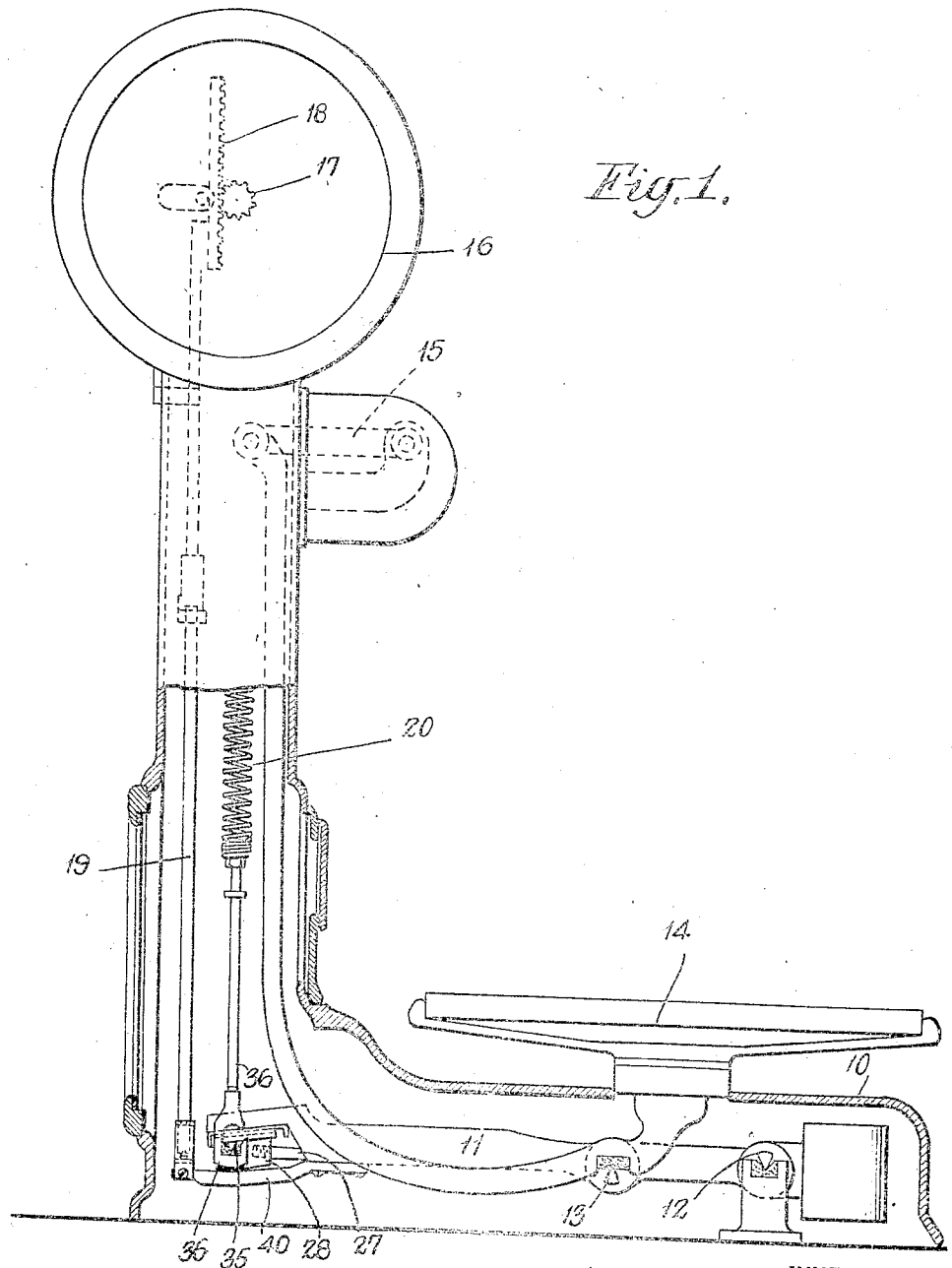

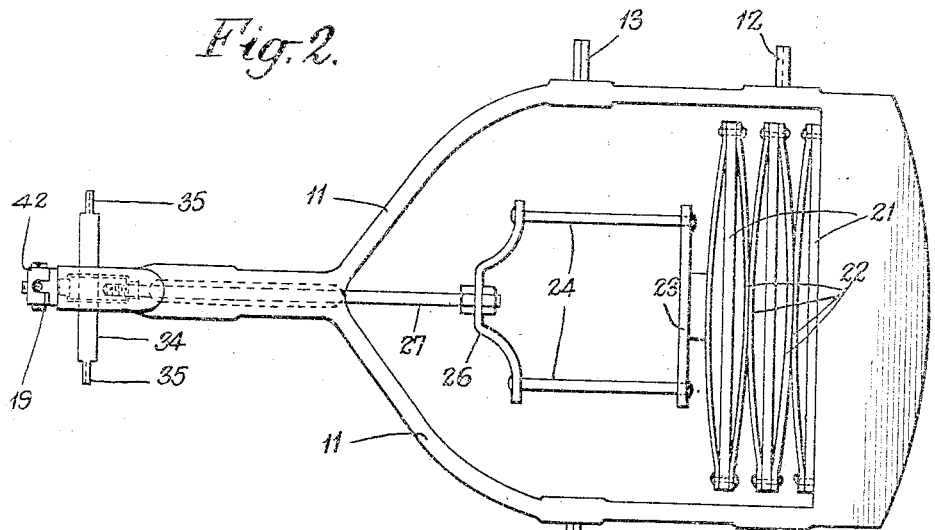
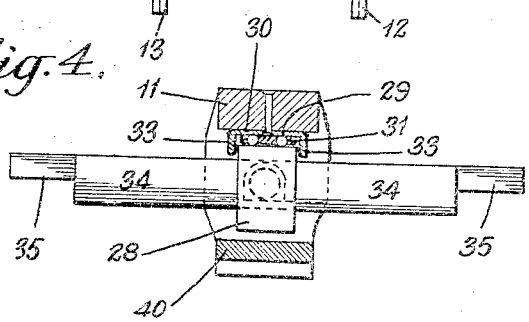
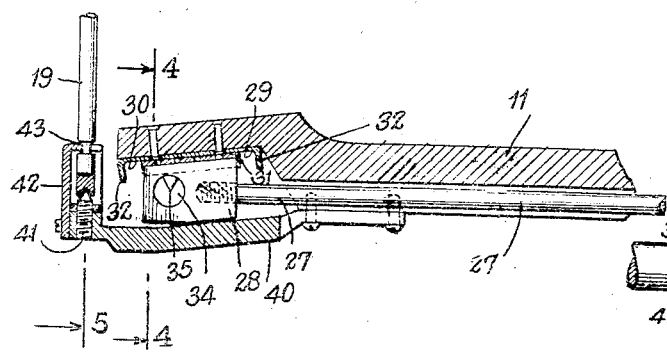

BERT W. KING AND ADAM C. BURKHEISER, OF DETROIT, MICHIGAN, ASSIGNORS TO DETROIT AUTOMATIC SCALE COMPANY, OF ELKHART, INDIANA, A CORPORATION OF INDIANA.

SCALE AND THERMOSTAT THEREFOR.

1,353,997.  Specification of Letters Patent.  Patented Sept. 28, 1920.

Application filed October 20, 1916. Serial No. 126,643.

*To all whom it may concern:*

Be it known that we, BERT W. KING and ADAM C. BURKHEISER, both citizens of the United States, residing at Detroit, in the county of Wayne and State of Michigan, have invented certain new and useful Improvements in Scales and Thermostats Therefor, of which the following is a full, clear, and exact description.

This invention relates to certain new and useful improvements in thermostats for spring scales of the form shown and described in the patent to Joseph Hopkinson, No. 770,807.

In the Hopkinson patent above referred to there is provided a thermostat which is adapted to vary the position of a pivot on the scale lever. To this pivot is attached a rod connecting with the counterbalancing springs and with the racks which operate the indicating mechanism. In the present construction a pivot is shifted as heretofore, but this pivot connects with the counterbalancing springs alone, and the indicator rack connection is separate and distinct therefrom and remains relatively fixed with respect to the scale lever at all times. This construction has been found to be more satisfactory, as the rack and pinion parts of a scale are extremely sensitive and movement of the racks is liable to affect the accuracy of the scale.

In correcting spring scales for temperature errors there are two factors to be compensated for: One is zero balance and the other load balance. Springs shorten at low temperatures and elongate at high temperatures. This variation affects the zero balance of the scale. Springs also become more flexible at high temperatures and less flexible at low temperatures. These spring changes affect the load balance of the scale. In the Hopkinson patent above referred to, load balance (which most affects the weighing) was compensated for by the lever thermostat, and supplementary devices such as shown in Hopkinson Patent No. 1,065,808 have frequently been used to correct these scales for zero balance.

One of the objects of the present invention is to provide a mechanism whereby both zero and load balance will be compensated for by the thermostat associated with the scale lever and the use of supplementary zero compensating devices may be obviated.

Other objects of the present invention will be set forth in detail in the accompanying specification, shown in the drawings and more particularly defined in the appended claims.

In the drawings:

Figure 1 is a side elevation with certain parts of the case broken away to show the interior construction. The scale is of the type shown and described in the copending application of C. E. Riedel, Ser. No. 111,936, filed July 28th, 1916.

Fig. 2 is a top plan view of the scale lever and shows the thermostat and associated parts in plan.

Fig. 3 is a central longitudinal sectional view of the nose end of the scale lever and the details of certain of the parts operated by the thermostat.

Fig. 4 is a sectional view taken on line 4—4 of Fig. 3 and looking in the direction of the arrows.

Fig. 5 is another detail sectional view taken on line 5—5 of Fig. 3 and looking in the direction of the arrows.

In more detail, the scale comprises the usual base 10 supporting a V-shaped scale lever 11 upon the usual knife edges 12. Other knife edges 13 on the lever support a platform 14 which is maintained horizontal by the usual overhead check 15. The indicating drum 16 is suitably journaled in a housing at the top of the scale and has pinions 17 thereon meshing with the racks 18. The racks 18 are connected with a draft rod 19 in any desired manner. The movement of the scale lever under the influence of various loads is assisted by counterbalancing springs 20 suitably supported at their upper ends in any desired manner, as by the means shown in Riedel application Ser. No. 111,936, above referred to.

Thermostat.

The thermostat comprises a number of units 21 and 22, the former having higher coefficients of expansion than the units 22. These units may be of any desired metals, as brass and steel or zinc and steel.

The thermostat is rigidly fastened to the front cross bar of the scale lever and the opposite end of the thermostat is connected with a cross bar 23 to which are attached rods 24, connected at their ends by a second cross member 26 to which is connected a rod 27. The rod lies in a slot in the lower side of the lever 11 and extends rearward toward the nose of the lever as shown in Fig. 3.

The rear end of the rod 27 is threaded into a wedge block 28. The rear end of the scale lever is made sloping, as shown at 29, this sloping plane surface making a slight acute angle with the line of the pivots 12 and 13 and corresponding with the angle of the wedge block 28. Secured by rivets to the sloping face 29 of the lever is a bearing plate 30, and intermediate this plate and the top of the wedge block is a ball-cage plate 31. The plate 30 has end and side projecting portions 32 and 33 to prevent the ball-cage plate from being displaced from position. The balls in the ball-cage permit the wedge block to move freely with respect to the plate 30. The wedge block is bored transversely to receive a rod or member 34 having downwardly pointing knife edges 35 at its ends, as shown in Fig. 4. These knife edges rest in agate bearings which are carried in the lower ends of a member 36 which has connected thereto the lower ends of the spring 20, see Fig. 1. The details of the spring connections are not herein described in detail as they are fully explained in Riedel application heretofore referred to.

*Operating connections to draft rod and racks.*

Suitably fastened to the rear end of the lever 11 is a bracket 40 having threaded therein and projecting upwardly therefrom a pointed pin 41 which rests in a cupped depression in the end of the draft rod 19. In order to prevent the draft rod being accidentally displaced from the position on the pointed pin 41, a stirrup member 42 is provided which is suitably fastened to the bracket 40 and which loosely engages in a circumferential notch 43 in the draft rod. This stirrup provides a ready means for retaining the draft rod in position, but at the same time permits the rod to be easily removed. At the same time friction is minimized as the stirrup is normally clear of the draft rod.

*Thermostat operation.*

It will be understood that the thermostat units expand and contract under varying temperatures and thereby shift the rod 27 and the wedge block 28 which is carried thereby longitudinally with respect to the scale lever 11. As temperatures increase the wedge block in its outward movement is forced downward with respect to the scale lever. The knife edges are also forced downward and the effect is to increase the spring tension. The increased spring tension restores the scale lever to the proper zero position, the lever having moved from zero by reason of the slack-ending and elongation of the counterbalancing springs occurring at such higher temperatures. When the temperature falls the reverse action takes place. In this way the thermostat is effective to always maintain the scale at the correct zero balance.

The outward and rearward movement of the wedge block 28 also varies the effective lever arm of the scale lever. At high temperatures the distance between the pivot 12 and the pivot 35 is greater than the distance between the same pivots at low temperatures. Consequently the springs exert the same effective pull upon the lever, regardless of their decreased or increased flexibility. The action of the thermostat in varying the effective lever arm, maintains the scale at proper load balance regardless of temperature.

It will be understood that the invention may be modified in various ways as will occur to those skilled in the art, and that the present invention is particularly defined by the appended claims.

We claim:

1. In a scale, in combination with a scale lever and a counterbalancing spring therefor, weight indicating mechanism, a draft rod connecting the weight indicating mechanism with the scale lever to actuate the former, a connection between the spring and lever, a thermostat for compensating for the variations in the spring due to changes in temperature, said thermostat being adapted to vary the connection of the spring and lever and being independent of the draft rod, whereby the relation to the draft rod and lever remains unchanged at all temperatures.

2. In a scale, in combination with a platform, a movable part connected thereto, a spring tensioned thereby, a weight indicator, an operating connection between the weight indicator and the movable part, a connection between the spring and lever, and a thermostat controlling the connection between the spring and the movable part and independent of the connection between the lever and the weight indicator.

3. In a scale, in combination, a scale lever, a weight-resisting spring tensioned thereby, a weight indicator, means connecting the weight indicator with the lever, to actuate the former, a connection between the spring and lever, a thermostat controlling the connection between the spring and the lever and independent of the means for moving the weight indicator, said thermostat being adapted to vary the initial tension on the spring and thereby maintain correct zero balance.

4. In a scale, in combination, a scale lever, a weight-resisting spring tensioned thereby, a weight indicator, means connecting the weight indicator with the scale lever to actuate the former, a connection between the spring and lever, a thermostat controlling the connection between the spring and the lever and independent of the means for moving the weight indicator, said thermostat being adapted to vary the initial tension on the spring and thereby maintain correct zero balance, and said thermostat being also adapted to vary the effective lever arm of the lever and thereby maintain correct load balance.

5. In a scale, in combination, a scale lever, a weight-resisting spring having a shiftable connection with the lever, thermostat operated means associated with the lever adapted to shift the connection of the lever and the spring longitudinally of the lever, to compensate for change in the flexibility of the spring at different temperatures, and vertically to compensate for elongation and contraction of the spring due to temperature changes.

6. In a scale, in combination, an element comprising a scale lever, an element comprising a weight-resisting spring, a wedge-block connecting said elements and shiftable relatively to one of the same whereby the point of connection of the spring and the lever can be shifted in two directions, and a thermostat carried by one of said elements and connected to the wedge block to shift the same in accordance with temperature changes.

7. In a scale, in combination, a scale lever, a shiftable wedge block having an inclined face bearing on said lever, a weight-resisting spring connected to the wedge block, and temperature-responsive means carried by the lever and coöperating with the wedge block to shift the same.

8. In a scale, in combination, a scale lever, an upwardly pointed pivot bearing on one end thereof, a draft rod resting upon said bearing, and means comprising a stirrup attached to the scale lever for preventing the said draft rod from being displaced from its position in coöperation with said bearing during the operation of the scale.

9. In a scale, in combination, an upwardly pointing conical bearing thereon, a draft rod cupped at its lower end to rest upon the said bearing, and a stirrup carried by the lever and adapted to coöperate with the draft rod to prevent the displacement of the draft rod and the bearing during violent oscillation of the scale lever.

10. In a scale, in combination, a scale lever, an upwardly pointing conical bearing carried thereby, a draft rod extending vertically and having a cupped lower end to receive said bearing, said draft rod having a groove therein and a stirrup carried by the scale lever projecting into the said groove, said stirrup standing normally clear of the draft rod but being adapted to contact with the draft rod and limit the movement of the same and thereby prevent the draft rod from being displaced in the scale lever during normal operation of the scale.

11. In a scale, in combination, a scale lever, an element comprising a weight resisting spring having a shiftable connection with the lever, and thermostatic means associated with the lever adapted to shift the connection of the lever and spring relative to the line of the lever pivots vertically to compensate for elongation and contraction of the spring due to temperature changes and to thereby maintain proper zero balance.

In testimony whereof we affix our signatures in the presence of two subscribing witnesses.

BERT W. KING.
ADAM C. BURKHEISER.

Witnesses:
CHARLES E. RIEDEL,
FELIX THOMAS.